Sept. 2, 1941.                C. LINDSEY                2,254,969
                    COMBINED CUTTER AND SCRAPER
                  Filed Nov. 6, 1939        2 Sheets-Sheet 1
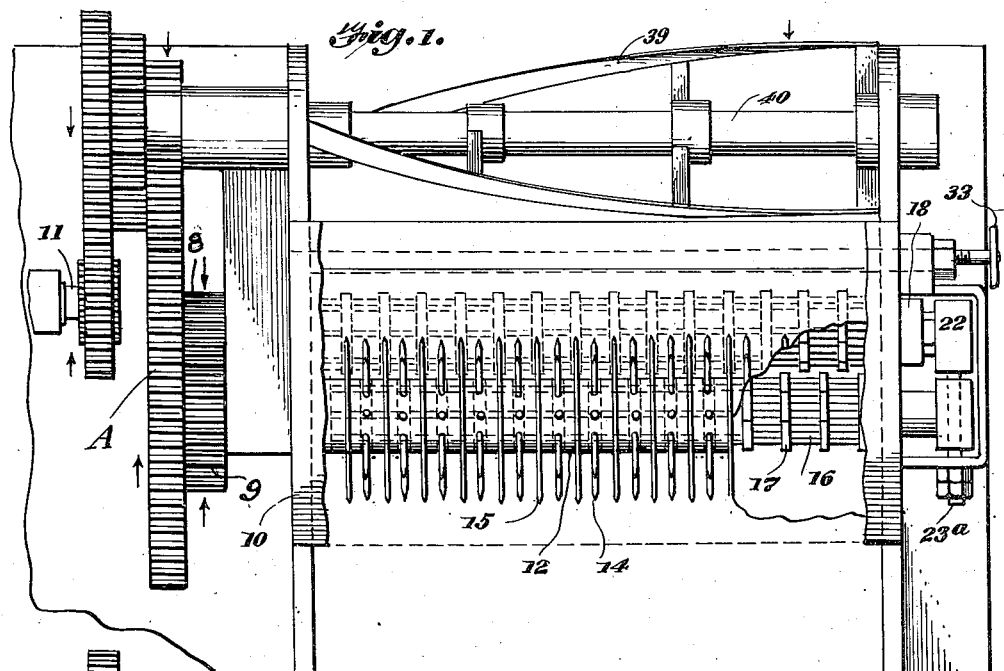
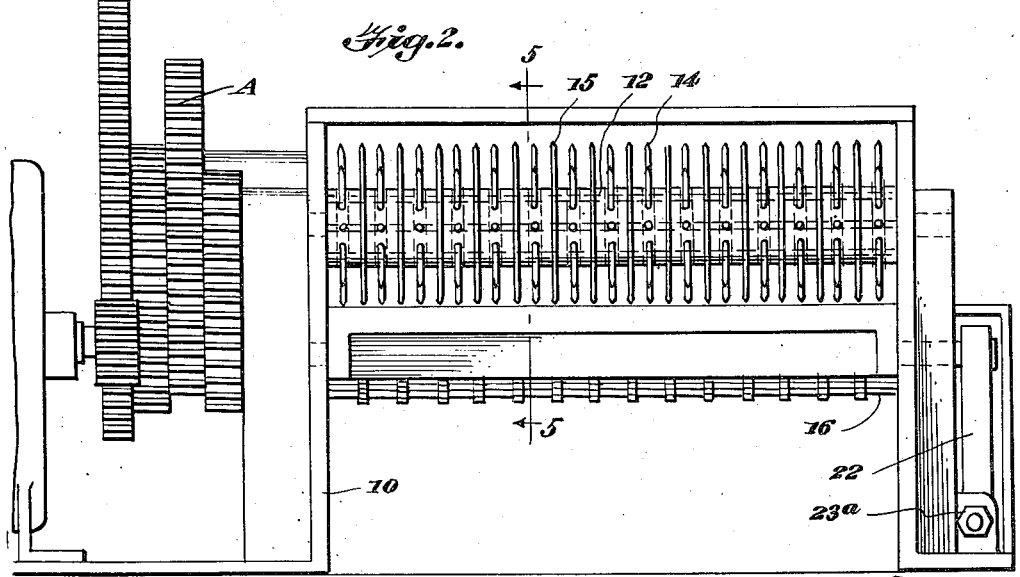
Inventor
CLINTON LINDSEY Sept. 2, 1941.  C. LINDSEY  2,254,969
COMBINED CUTTER AND SCRAPER
Filed Nov. 6, 1939  2 Sheets-Sheet 2
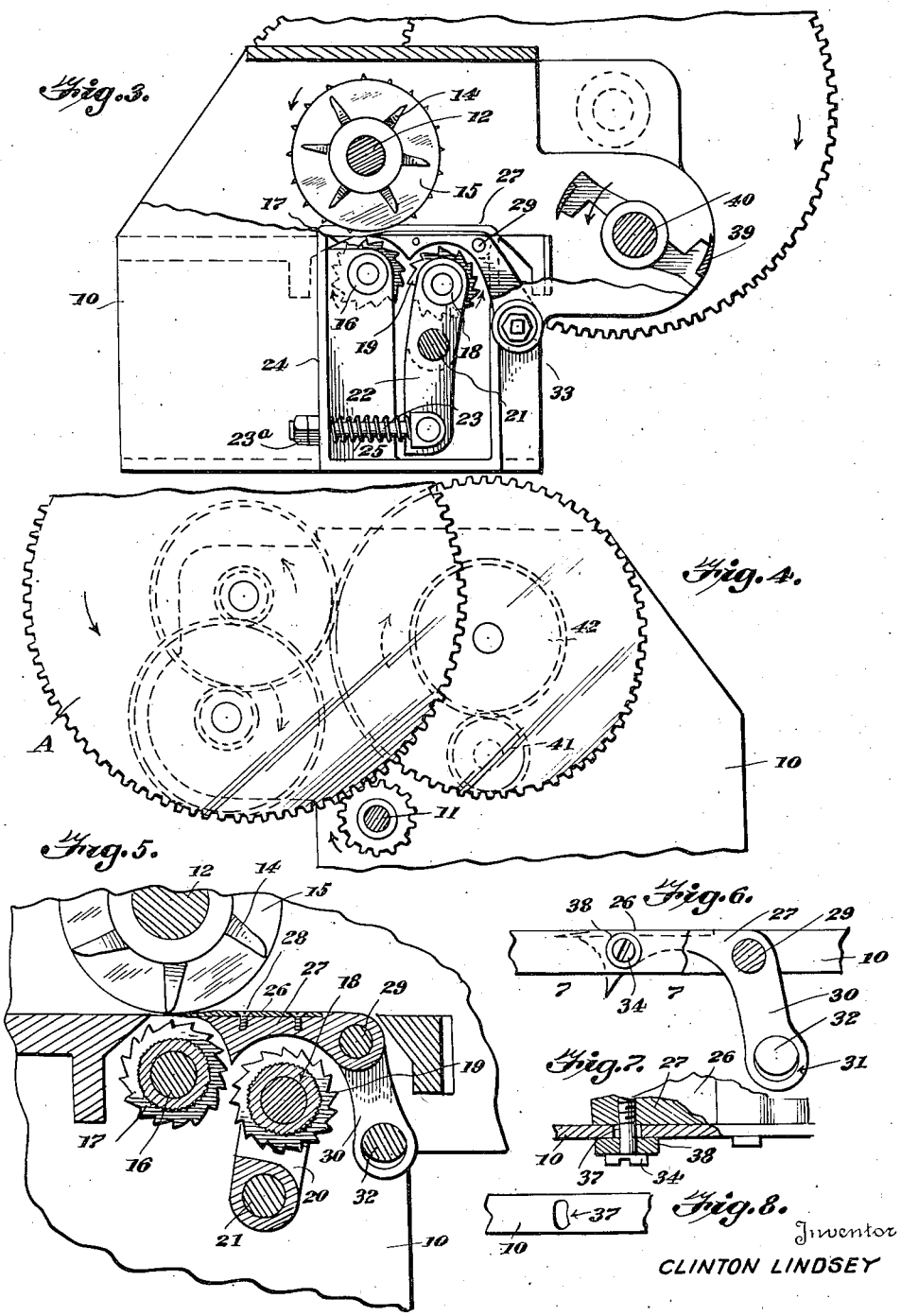

Patented Sept. 2, 1941

2,254,969

UNITED STATES PATENT OFFICE 2,254,969

COMBINED CUTTER AND SCRAPER

Clinton Lindsey, Salem, N. J.

Application November 6, 1939, Serial No. 303,155

5 Claims. (Cl. 146—130)

This invention relates to a combined cutter and scraper, and has for one of its objects the production of means for cutting and scraping flesh and fat free of hide, and simultaneously separating the meat from the hide with the cutting of strips of hog and similar meat into small particles for domestic purposes.

A further object of this invention is the production of a simple and efficient means for firmly holding the scraper-knife in an adjusted tilted position and to facilitate the adjustment of said scraper-knife to a minute degree.

The present invention constitutes an improvement upon the machine as covered in Patent #1,365,927, dated January 18, 1921.

Other objects and advantages of this invention will appear throughout the following specification and claims.

In the drawings:

Figure 1 is a top plan view of the machine;

Figure 2 is a view of the inner end of the machine;

Figure 3 is an irregular fragmentary longitudinal section of the machine, certain parts being shown in side elevation;

Figure 4 is a side elevational view of the operating gear mechanism;

Figure 5 is a fragmentary vertical sectional view taken on line 5—5 of Figure 2;

Figure 6 is a side elevational view of the scraper-knife and its operating parts, certain parts being shown in section;

Figure 7 is a sectional view taken on line 7—7 of Figure 6;

Figure 8 is a fragmentary side elevational view of the frame showing the slot formed therein to permit of the proper adjustment of the scraper-knife.

By referring to the drawings, it will be seen that 10 designates the frame of the machine which carries a main driving shaft 11. This driving shaft 11 drives a train of gears A for rotating a shaft 12 carrying a series of feeding elements 14 and cutting discs 15 of the conventional type, in the direction of the arrow indicated in Figure 3.

A scraper-knife roll 16 is located directly below the shaft 12 and in alignment therewith, and this scraper-knife roll 16 carries a plurality of spaced serrated collars or toothed discs 17. An adjustable scraper-knife roll 18 carrying a plurality of spaced serrated toothed discs is mounted in substantial horizontal alignment with the roll 16. The discs 17 are arranged in staggered relation with respect to the discs 19. The rolls 16 and 18 are adapted to draw the hide down between the rolls as set forth in the following description. This roll 18 is carried by the upstanding links 20 which links are carried by a transverse journal shaft 21. A vertical extending adjusting lever 22 is also journaled upon the shaft 21 and engages at its upper end the roll 18. The lower end of the lever 22 is pivotally engaged by a tension link 23, which link 23 extends through the support 24. The outer end of the link 23 carries a pair of lock nuts 23a which engage the support 24 and limit the movement of the link 23 in one direction. A coil spring 25 is carried by the link 23 and abuts the support 24 to yieldably urge the lower end of the lever 22 away from the support and the roll 18 toward the roll 16. By adjusting the lock nuts 23a the lever 22 may be rocked upon the shaft 21 to move the roll 18 toward or away from the roll 16, and the coil spring 25 will hold the lever 22 in a yieldable position so that the roll 18 under excess pressure may yieldably swing away from the roll 16. The rolls 16 and 18 are driven by the spur gears 8 and 9 respectively which form segments of the train of gears A in a manner similar to the spur gears 21 and 22 mentioned in my Patent Number 1,365,927, referred to above.

A scraper-knife 26 is carried by a transverse bar 27, and this knife or blade 26 is detachably secured to the bar 27 by means of suitable screws 28. This bar 27 is journaled at its rear end upon a journal shaft 29 extending transversely of the machine and in the rear of the knife or blade 26. The bar 27 is shaped on its forward and under faces to conform to the contour of the scraper-knives previously described. The bar 27 as shown in detail in Figures 5 and 6, is provided with a depending arm 30 having a circular aperture 31 at its lower end through which extends an eccentric shaft 32, which shaft is journaled in a suitable manner upon the frame 10 and carries a hand-wheel 33 at its outer end. By rotating the hand-wheel 33 and consequently the eccentric shaft 32 it will be seen that the depending arm 30 will be swung forwardly or rearwardly for raising or lowering the knife 26 thereby permitting the knife to be adjusted to a minute degree merely by rotating the operating handle 33. This knife 26 may be locked in this adjusted position through the medium of a set screw 34 which passes through the frame 10 and engages the bar 27 in the manner shown in Figure 7. The frame is provided with a vertically extending slot 35 through which the set screw 34 extends, and this set screw 34 also passes through a suitable clamping washer 38 to facilitate the locking of the device in a set position.

As the hide is severed from the flesh and fat, the latter will be caused to pass to the mincing knives 39 which are carried by an operating shaft 40 driven through the medium of the gear 41 which meshes with a gear 42 of the gear train A.

It should be understood that any suitable or desired means may be employed for driving the cutting discs 15 and feed mechanism, as well as the other moving parts of the machine, without departing from the spirit of the invention.

A suitable cover may be employed for the machine and the floor and other parts thereof may be suitably slotted to permit proper operation of the parts.

As the hide is scraped from the flesh and fat, it is caught by the teeth 17 and 19 of the scraper rolls 16 and 18 respectively, which rolls rotate in opposite directions, the hide is drawn down between the rolls in the same manner as described in Patent No. 1,365,927 above referred to. The serrated toothed discs assist in this drawing process and since the roll 18 is mounted in a yielding manner, the roll 18 will respond to different thicknesses of hide. As the hide is severed from the flesh and fat by means of the knife 26, the flesh and fat are caused to pass to the mincing knives 39 which are secured to the shaft 40 and these knives 39 are adapted to cut the strips of flesh and fat into small particles.

It should also be understood that certain detail changes in the mechanical construction, arrangement and combination of parts may be employed without departing from the spirit of the invention, so long as such changes fall within the scope of the appended claims.

Having described the invention, what I claim as new is:

1. A machine of the class described comprising a frame, a feeding means therefor, stripping means comprising a stripping roll located directly below the feeding means and an adjustable roll located in substantial parallel relation with respect to said first mentioned roll, said adjustable roll being rockably supported adjacent the first mentioned roll, an adjusting lever engaging the adjustable roll and having a depending end, an adjusting link engaging said frame for limiting the swinging of said lever in one direction and also limiting the movement of the adjustable roll with respect to the first mentioned roll, and a spring carried by said link for yieldably holding the adjustable roll in an adjusted position and at the same time permitting said adjustable roll under excess pressure to move away from the first mentioned roll.

2. A machine of the class described comprising a frame, a feeding means, a scraper-knife, a bar supporting said scraper-knife, means for rockably supporting the bar upon said frame, a depending arm carried by the bar and having an aperture formed therein, an eccentric shaft extending through said aperture, a hand-operating means engaging said shaft for rotating the same whereby said bar will be rocked upon its mounting to minutely adjust the bar, and locking means engaging the bar for fixedly holding the bar in a set adjusted position.

3. A machine of the class described comprising a frame, a feeding means, a scraper-knife, a bar supporting said scraper-knife, means for rockably supporting the bar upon said frame, a depending arm carried by the bar and having an aperture formed therein, an eccentric shaft extending through said aperture, a hand-wheel engaging said shaft for rotating the same whereby said bar will be rocked upon its mounting to minutely adjust the bar, and locking means engaging the bar for fixedly holding the bar in a set adjusted position.

4. A machine of the class described comprising a frame, a feeding means, a scraper-knife, a bar supporting said scraper-knife, means for rockably supporting the bar upon said frame, a depending arm carried by the bar and having an aperture formed therein, an eccentric shaft extending through said aperture, a hand-operating means engaging said shaft for rotating the same whereby said bar will be rocked upon its mounting to minutely adjust the bar, locking means engaging the bar for fixedly holding the bar in a set adjusted position, said locking means comprising a set screw, the frame having a vertically extending slot through which said set screw extends, and said set screw engaging the bar for locking the set screw in a set longitudinally adjusted position within the slot.

5. A machine of the class described comprising a frame, a feeding means therefor, stripping means comprising a stripping roll located directly below the feeding means and an adjustable roll located in substantial parallel relation with respect to said first mentioned roll, said adjustable roll being rockably supported adjacent the first mentioned roll, an adjusting lever engaging the adjustable roll and having a depending end, an adjusting link engaging said frame for limiting the swinging of said lever in one direction and also limiting the movement of the adjustable roll with respect to the first mentioned roll, and means carried by said link for yieldably holding the adjustable roll in an adjusted position and at the same time permitting said adjustable roll under excess pressure to move away from the first mentioned roll in a manner whereby different thicknesses of hide may be accommodated.

CLINTON LINDSEY.